United States Patent
Wang et al.

(10) Patent No.: US 12,025,156 B1
(45) Date of Patent: Jul. 2, 2024

(54) PUMP STATION FOR FERTILIZATION AND IRRIGATION SYSTEM AND WATER FEEDING PUMP OR FERTILIZER APPLYING PUMP THEREOF

(71) Applicants: Taizhou Vocational College of Science & Technology, Taizhou (CN); Wenling Fluid Machinery Technology Institute of Jiangsu University, Taizhou (CN)

(72) Inventors: Chao Wang, Taizhou (CN); Zhenhua Shen, Taizhou (CN); Jianqiang Ma, Taizhou (CN); Jinfeng Zhang, Taizhou (CN); Yin Luo, Taizhou (CN); Guidong Li, Taizhou (CN)

(73) Assignees: Taizhou Vocational College of Science & Technology, Taizhou (CN); Wenling Fluid Machinery Technology Institute of Jiangsu University, Taizhou (CN)

( * ) Notice: Subject to any disclaimer, the term of this patent is extended or adjusted under 35 U.S.C. 154(b) by 0 days.

(21) Appl. No.: 18/607,255

(22) Filed: Mar. 15, 2024

(30) Foreign Application Priority Data

Apr. 28, 2023 (CN) .......................... 202310477563.9

(51) Int. Cl.
*F04D 29/66* (2006.01)
*A01C 23/04* (2006.01)
(Continued)

(52) U.S. Cl.
CPC ............. *F04D 29/669* (2013.01); *F04D 1/00* (2013.01); *F04D 13/06* (2013.01);
(Continued)

(58) Field of Classification Search
CPC .... F04D 29/406; F04D 29/426; F04D 29/445; F04D 29/669; F04D 29/66; F04D 29/466;
(Continued)

(56) References Cited

U.S. PATENT DOCUMENTS 3,220,349 A * 11/1965 White ................. F04D 29/0416
417/357
3,318,253 A * 5/1967 Campolong ........ F04D 29/5806
165/104.31
(Continued)

FOREIGN PATENT DOCUMENTS

| CN | 112377456 A | 2/2021 |
| CN | 115405558 A | 11/2022 |
| CN | 115628236 A | 1/2023 |

*Primary Examiner* — Peter J Bertheaud
(74) *Attorney, Agent, or Firm* — George D. Morgan

(57) ABSTRACT

The invention discloses a water feeding pump or a fertilizer applying pump for a pump station of a fertilization and irrigation system. The water feeding pump (2) or the fertilizer applying pump (3) is a centrifugal pump. The centrifugal pump includes a volute and an impeller. The impeller includes a front disc (12), a rear disc (13), and main blades (14), and a plurality of back blades (18) distributed along a circumferential direction are disposed on a back surface of the rear disc, where an auxiliary rotating disc (11) is disposed between the impeller and a rear side wall of the volute, the auxiliary rotating disc is a rotating member and is driven by the back blades of the impeller to rotate.

5 Claims, 4 Drawing Sheets

(51) Int. Cl.
  *A01G 25/02*  (2006.01)
  *F04D 1/00*  (2006.01)
  *F04D 13/06*  (2006.01)
  *F04D 13/14*  (2006.01)
  *F04D 15/00*  (2006.01)
  *F04D 29/049*  (2006.01)
  *F04D 29/40*  (2006.01)
  *F04D 29/42*  (2006.01)
  *F04D 29/44*  (2006.01)
  *F04D 29/46*  (2006.01)
  *F04D 29/48*  (2006.01)
  *F04D 29/58*  (2006.01)

(52) U.S. Cl.
  CPC ..... *F04D 13/0606* (2013.01); *F04D 13/0646* (2013.01); *F04D 29/049* (2013.01); *F04D 29/406* (2013.01); *F04D 29/426* (2013.01); *F04D 29/4293* (2013.01); *F04D 29/445* (2013.01); *F04D 29/466* (2013.01); *F04D 29/486* (2013.01); *F04D 29/66* (2013.01); *A01C 23/04* (2013.01); *A01G 25/02* (2013.01); *F04D 13/14* (2013.01); *F04D 15/0005* (2013.01); *F04D 29/5886* (2013.01)

(58) Field of Classification Search
  CPC ........ F04D 1/00; F04D 13/06; F04D 13/0606; F04D 29/486; F04D 29/4293; F04D 29/049; F04D 13/0646
  See application file for complete search history.

(56) References Cited

U.S. PATENT DOCUMENTS 3,644,067 A * 2/1972 Yowell ................... F04D 13/06
                     417/372
6,012,909 A * 1/2000 Sloteman ............. F04D 13/064
                     417/370

* cited by examiner

PUMP STATION FOR FERTILIZATION AND IRRIGATION SYSTEM AND WATER FEEDING PUMP OR FERTILIZER APPLYING PUMP THEREOF

CROSS-REFERENCE TO RELATED APPLICATIONS

The application claims priority to Chinese patent application No. 2023104775639, filed on Apr. 28, 2023, the entire contents of which are incorporated herein by reference.

TECHNICAL FIELD

The present invention relates to the technical field of integrated irrigation and fertilization systems for agriculture, forestry, and the like, and in particular to a pump station for a fertilization and irrigation system and a water feeding pump or a fertilizer applying pump thereof.

BACKGROUND

The water and fertilizer integrated intelligent irrigation and fertilization system has been widely applied to irrigation and fertilization in agriculture and forestry, and its performance directly affect the quality of irrigation and fertilization. The integrated water and fertilizer irrigation system generally includes a water supply device, a fertilizer supply device, and a control device. The water supply device includes a water source, a water feeding pump and a filter which are connected in sequence through a pipeline. The fertilizer supply device includes a fertilizer solution barrel and a fertilizer applying pump which are connected in sequence through a pipeline. A fertilization and irrigation main duct extends to a region required to be irrigated/fertilized through a pipeline, the region for example is a sprinkling irrigation region, a micro-sprinkling irrigation region, or a drip irrigation region. A plurality of sprinkler heads are disposed in the sprinkling irrigation region, a plurality of micro-sprinkler heads are disposed in the micro-sprinkling irrigation region, and a plurality of drip irrigation emitters are disposed in the drip irrigation region. However, the existing water feeding pumps or fertilizer applying pumps used in pump stations of sprinkling irrigation systems still have problems of poor anti-cavitation performance and unstable output pressure of the pump.

SUMMARY

The present invention aims to provide a pump station for a fertilization and irrigation system and a water feeding pump or a fertilizer applying pump thereof, for overcoming the defects in the prior art. By means of the design of an auxiliary rotating disc and an associated structure thereof, pressure loss can be reduced, anti-cavitation performance of the centrifugal pump can be improved, and cooling of bearings can be completed, so that stability of output pressure of the water feeding pump or the fertilizer applying pump can be improved, thereby ensuring that the water supply or fertilizer supply pressure/flow of the pump station of the sprinkling irrigation system is stable, and saving water and fertilizer for the integrated irrigation and fertilization system.

In order to realize the purposes mentioned above, the present invention adopts the following technical solution:
a water feeding pump or a fertilizer applying pump for a pump station of a fertilization and irrigation system, where the water feeding pump (2) or the fertilizer applying pump (3) is a centrifugal pump, the centrifugal pump includes a pump body portion (6), the pump body portion includes a volute (9) and an impeller, the impeller is mounted in the volute and includes a front disc (12), a rear disc (13), main blades (14), and an inlet ring (15), the plurality of main blades are distributed along a circumferential direction and connected between the front disc and the rear disc, a plurality of back blades (18) distributed along the circumferential direction are disposed on a back surface of the rear disc, and the impeller is mounted on a rotating shaft (10), where an auxiliary rotating disc (11) is disposed between the impeller and a rear side wall of the volute, the auxiliary rotating disc is a rotating member and is driven by the back blades of the impeller to rotate.

Further, the auxiliary rotating disc (11) includes a first radial disc (19), an axial ring (20), and a second radial disc (21) which are sequentially connected, a support cylinder (22) is disposed at a center of the first radial disc, and a plurality of auxiliary blades (23) distributed along the circumferential direction are disposed on a side face, close to the back blades (18), of the first radial disc, a position of the auxiliary blade is disposed corresponding to a position of the back blade, a radial length of the auxiliary blade is substantially equal to a radial length of the back blade, the support cylinder is rotatably connected to the rotating shaft (10) and/or a volute cylinder portion (25) of the volute, a plurality of communication grooves (24) distributed along the circumferential direction are disposed on the first radial disc, the communication groove is in communication with a first chamber or a first gap that is between the rear disc (13) of the impeller and the auxiliary rotating disc and a second chamber or a second gap that is between the auxiliary rotating disc and the rear side wall of the volute, and the second radial disc is disposed in a diffuser that is between an outer circumferential surface of the impeller and a pressurized water chamber of the volute.

Further, a first injection hole is disposed on the rear side wall of the volute, the first injection hole is in communication with a second injection hole on an inlet pipe (31) of the volute through an injection pipeline (32), the second injection hole is used for injecting a high-pressure liquid to an inlet end of the impeller, and a control valve is disposed on the injection pipeline.

Further, an outer circumferential surface of the support cylinder (22) is rotatably connected to an inner circumferential surface of the volute cylinder portion (25) of the volute (9) through one or more first bearings (26), an inner circumferential surface of the support cylinder is rotatably connected to an outer circumferential surface of the rotating shaft (10) through one or more second bearings (27), a first channel is formed between the outer circumferential surface of the support cylinder and the volute cylinder portion, and a second channel is formed between the inner circumferential surface of the support cylinder and the rotating shaft.

Further, radial holes (28) and an axial hole (29) are disposed on the rotating shaft (10), where the plurality of radial holes are distributed along the circumferential direction, the axial hole penetrates through an end of the rotating shaft located at an impeller cavity, and the radial holes are in communication with the axial hole and the impeller cavity.

Further, a protruding step segment is disposed on the rotating shaft (10), a spiral groove (30) is disposed on the protruding step segment, the protruding step segment is disposed at a position corresponding to a right end of the support cylinder (22), the protruding step segment is disposed between the second bearings (27) and the radial holes (28), and the spiral groove is used for improving fluidity of liquid in the second channel flowing to a side of the radial holes.

Further, the plurality of communication grooves (24) and the plurality of auxiliary blades (23) are disposed alternately in the circumferential direction, a radial length range of the communication groove is within a radial length range of the auxiliary blade, and a position of the communication groove is disposed corresponding to a position of the first injection hole, the auxiliary blade is an arc-shaped blade, the communication groove is an arc-shaped groove, and the back blade 918 is an arc-shaped blade or a straight blade.

Further, an inlet end of the front disc (12) is provided with the inlet ring (15), the inlet ring extends axially, guide blades (16) and a central flow guide body (17) are disposed in the inlet ring, the plurality of guide blades are distributed along the circumferential direction and connected to an outer circumferential surface of the central flow guide body, the other ends of the guide blades are connected to an inner circumferential surface of the inlet ring, the central flow guide body is of a cylindrical structure, and has an arc-shaped flow guide surface at an upstream end and a downstream end thereof.

A pump station for a fertilization and irrigation system, comprising a base (1), a water feeding pump (2), a fertilizer applying pump (3), a control system (4), a fertilization and irrigation main duct (5), a pump body portion (6), a motor (7), and a water outlet duct (8), where the water feeding pump, the fertilizer applying pump, and the control system are mounted on the base, the water feeding pump or the fertilizer applying pump is a centrifugal pump, the water feeding pump or the fertilizer applying pump includes the pump body portion and the motor, the pump body portion is connected to the motor through a transmission assembly, an outlet end of the pump body portion is connected to the water outlet duct, the water outlet duct is connected to the fertilization and irrigation main duct, and the fertilizer applying pump is connected to the fertilization and irrigation main duct.

Further, the water feeding pump (2) includes one or more centrifugal pumps, the water feeding pump is used for supplying water, the fertilizer applying pump (3) includes one or more centrifugal pumps, and the fertilizer applying pump is used for supplying fertilizer solution; and a control valve, a pressure gauge and/or a flowmeter are connected to the water outlet duct (8) and/or the fertilization and irrigation main duct (5).

According to the pump station for a fertilization and irrigation system and the water feeding pump or the fertilizer applying pump thereof in the present invention, by means of the design of the auxiliary rotating disc and an associated structure thereof, the auxiliary rotating disc is driven by the back blades of the impeller to rotate, a high-pressure liquid on a back pressure side of the impeller passes through the communication grooves and then a first part of the liquid passes through a gap between the auxiliary rotating disc and the rear side wall of the volute to flow back to the pressurized water chamber of the volute, so that pressure loss can be reduced; a second part of the liquid passes through the first injection hole and the injection pipeline to be guided to the second injection hole, and the second injection hole is used for injecting the high-pressure liquid to the inlet end of the impeller, so that the anti-cavitation performance of the centrifugal pump can be improved; a third part of the liquid passes through the gap between the auxiliary rotating disc and the rear side wall of the volute to flow to the first channel, so as to cool the bearings, and can passes through the radial holes and the axial hole to flow back into the impeller cavity, so that the anti-cavitation performance of the centrifugal pump can be further improved; and another part of the high-pressure liquid on the back pressure side of the impeller passes through the second channel to flow to the radial holes and the axial hole and flow back into the impeller cavity, thereby completing cooling of the bearings and improving the anti-cavitation performance of the centrifugal pump.

According to the pump station for a fertilization and irrigation system and the water feeding pump or the fertilizer applying pump thereof in the present invention, by means of the design of an auxiliary rotating disc and an associated structure thereof, pressure loss can be reduced, anti-cavitation performance of the centrifugal pump can be improved, and cooling of the bearings can be completed, so that stability of output pressure of the water feeding pump or the fertilizer applying pump can be improved, thereby ensuring that the water supply or fertilizer supply pressure/flow of the pump station of the sprinkling irrigation system is stable, and saving water and fertilizer for the integrated irrigation and fertilization system.

Figure 1:
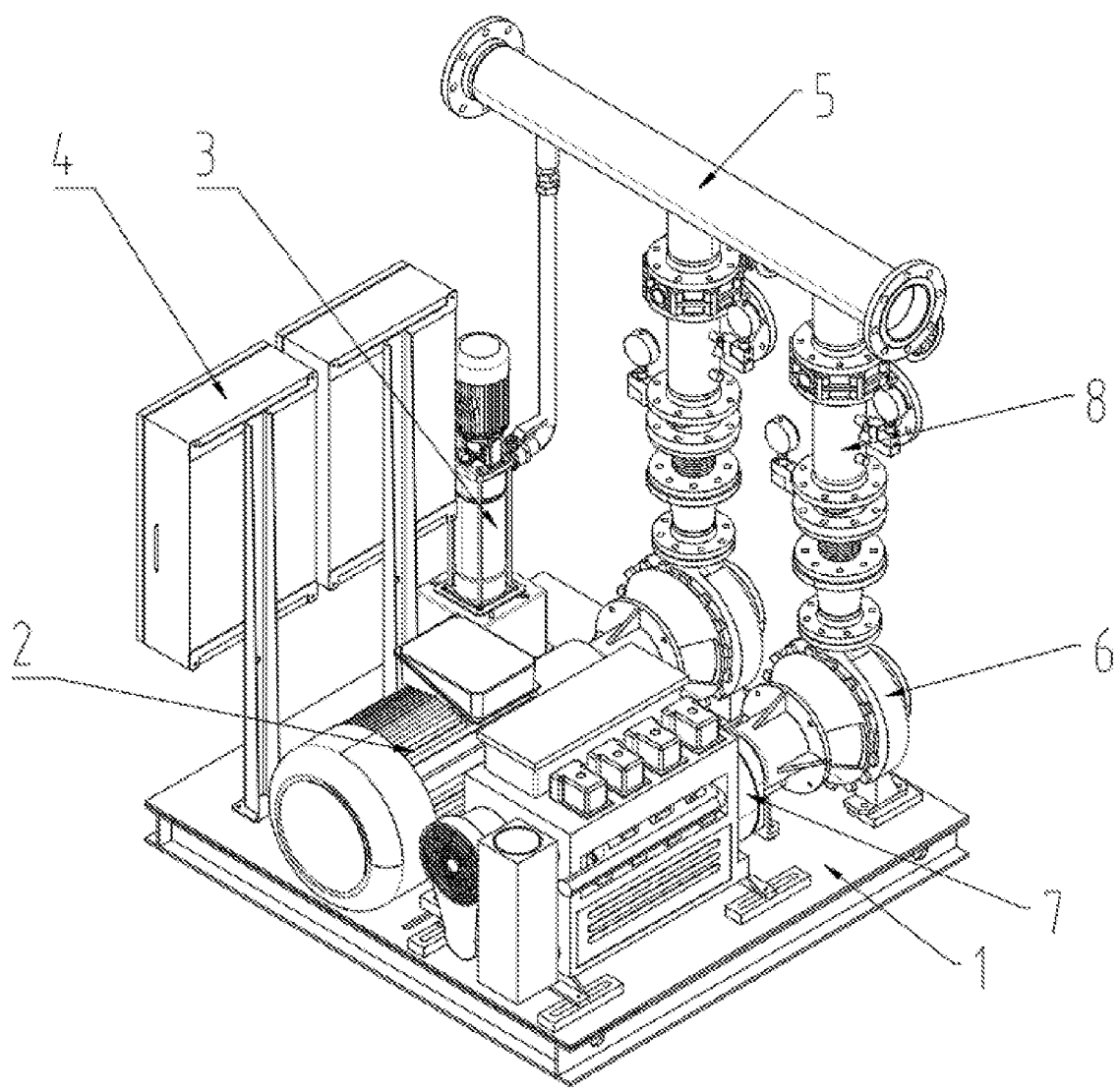
FIG. 1 is a schematic structural diagram of a sprinkling irrigation pump station according to the present invention.

In the drawings: base 1, water feeding pump 2, fertilizer applying pump 3, control system 4, irrigation main duct 5, pump body portion 6, motor 7, water outlet duct 8, volute 9, rotating shaft 10, auxiliary rotating disc 11, front disc 12, rear disc 13, main blade 14, inlet ring 15, guide blade 16, central flow guide body 17, back blade 18, first radial disc 19, axial ring 20, second radial disc 21, support cylinder 22, auxiliary blade 23, communication groove 24, volute cylinder portion 25, first bearing 26, second bearing 27, radial hole 28, axial hole 29, spiral groove 30, inlet pipe 31, injection pipeline 32; arrows "→, ←, ↑, ↓" indicating a liquid flow direction/flow state.

DETAILED DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following describes the present invention in detail with reference to the accompanying drawings.

As shown in FIGS. 1 to 4, a pump station for a fertilization and irrigation system includes a base 1, a water feeding pump 2, a fertilizer applying pump 3, a control system 4, a fertilization and irrigation main duct 5, a pump body portion 6, a motor 7, and a water outlet duct 8. The water feeding pump 2, the fertilizer applying pump 3, and the control system 4 are mounted on the base 1. The water feeding pump 2 or the fertilizer applying pump 3 is a centrifugal pump, and the water feeding pump 2 or the fertilizer applying pump 3 includes the pump body portion 6 and the motor 7. The pump body portion 6 is connected to the motor 7 through a transmission assembly or a coupling, and an outlet end of the pump body portion 6 is connected to the water outlet duct 8. The water outlet duct 8 is connected to the fertilization and irrigation main duct 5, and the fertilizer applying pump 3 is connected to the fertilization and irrigation main duct 5.

The water feeding pump 2 includes one or more centrifugal pumps, and the water feeding pump 2 is used for supplying water. The fertilizer applying pump 3 includes one or more centrifugal pumps, or vortex pumps, or metering pumps, and the fertilizer applying pump 3 is used for supplying fertilizer solution. A control valve, a pressure gauge and/or a flow meter are connected to the water outlet duct 8 and/or the fertilization and irrigation main duct 5.

Figure 2:
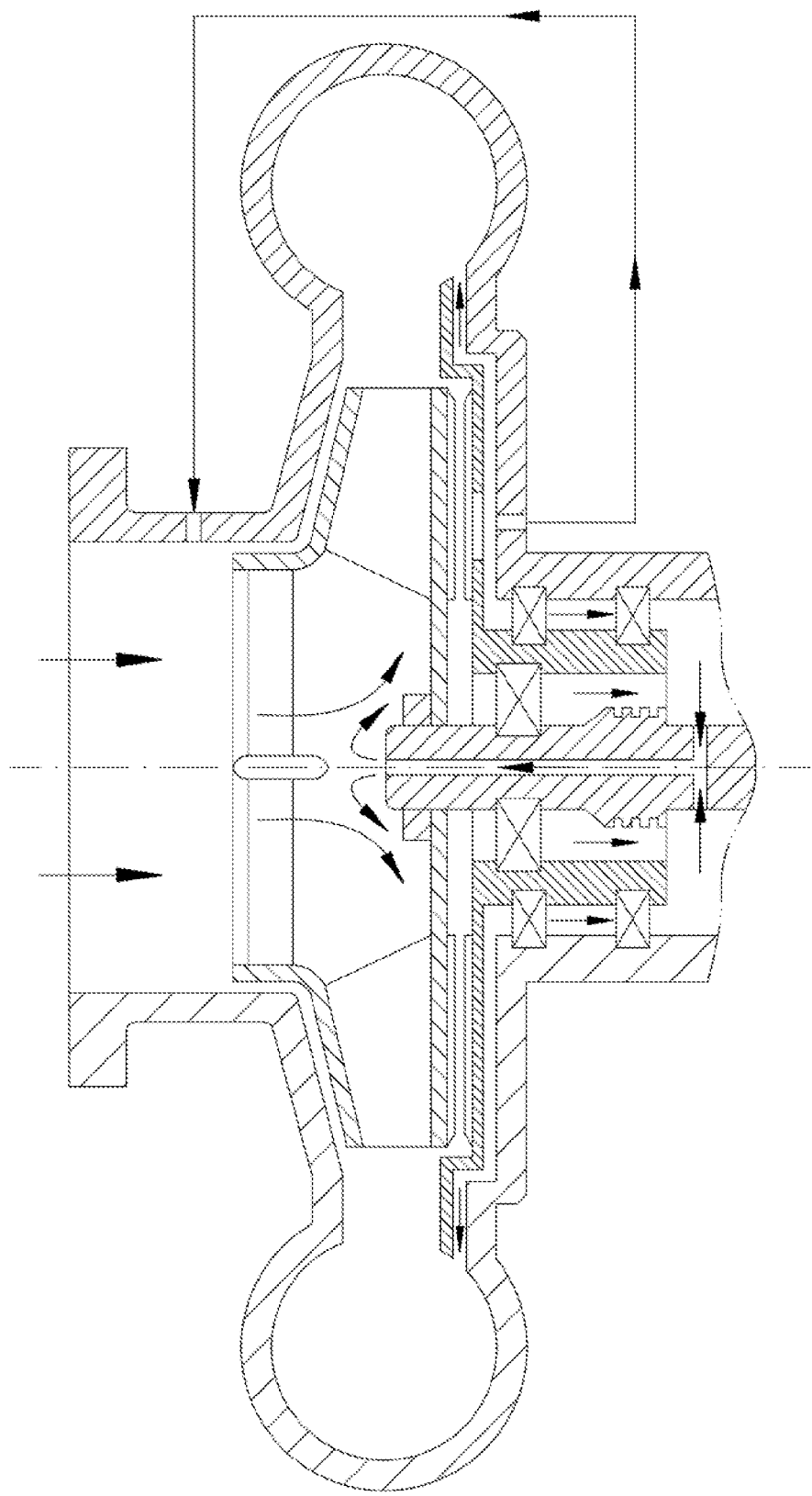
FIG. 2 is a schematic structural diagram of a water feeding pump or a fertilizer applying pump according to the present invention.
Figure 3:
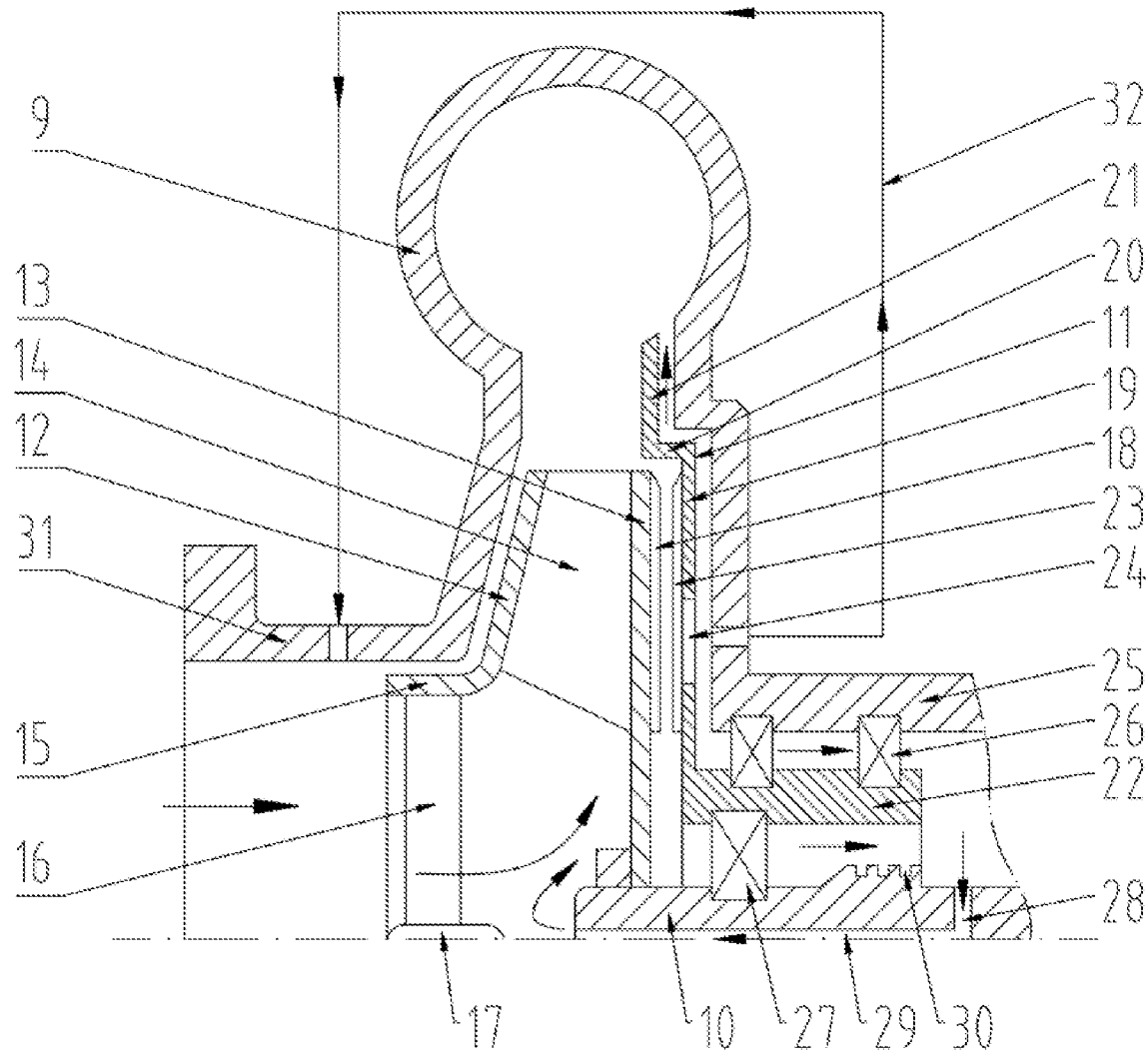
FIG. 3 is a schematic structural diagram of a water feeding pump or a fertilizer applying pump according to the present invention.

As shown in FIG. 2 and FIG. 3, arrows "→, ←, ↑, ↓" indicate a liquid flow direction/flow state. The pump body portion 6 includes a volute 9 and an impeller. The impeller is mounted in the volute and includes a front disc 12, a rear disc 13, main blades 14, and an inlet ring 15. The plurality of main blades 14 are distributed along a circumferential direction and connected between the front disc 12 and the rear disc 13, and a plurality of back blades 18 distributed along the circumferential direction are disposed on a back surface of the rear disc 13, and the impeller is mounted on a rotating shaft 10. An auxiliary rotating disc 11 is disposed between the impeller and a rear side wall of the volute 9, and the auxiliary rotating disc 11 is a rotating member and is driven by the back blades 18 of the impeller to rotate.

The auxiliary rotating disc 11 includes a first radial disc 19, an axial ring 20, and a second radial disc 21 which are sequentially connected, a support cylinder 22 is disposed at a center of the first radial disc 19, and a plurality of auxiliary blades 23 distributed along the circumferential direction are disposed on a side face, close to the back blades 18, of the first radial disc 19, a position of the auxiliary blade 23 is disposed corresponding to a position of the back blade 18, a radial length of the auxiliary blade 23 is substantially equal to a radial length of the back blade 18, the support cylinder 22 is rotatably connected to the rotating shaft 10 and/or a volute cylinder portion 25 of the volute 9, a plurality of communication grooves 24 distributed along the circumferential direction are disposed on the first radial disc 19, the communication groove 24 is in communication with a first chamber that is between the impeller rear disc 13 and the auxiliary rotating disc 11 and a second chamber that is between the auxiliary rotating disc 11 and the rear side wall of the volute, and the second radial disc 21 is located in a diffuser that is between an outer circumferential surface of the impeller and a pressurized water chamber of the volute.

A first injection hole is disposed on the rear side wall of the volute, the first injection hole is in communication with a second injection hole on an inlet pipe 31 of the volute through an injection pipeline 32, the second injection hole is used for injecting a high-pressure liquid to an inlet end of the impeller, and a control valve is disposed on the injection pipeline 32. The structure of this part is the prior art in this field, and does not serve as an innovation point of the present invention.

Further, an outer circumferential surface of the support cylinder 22 is rotatably connected to an inner circumferential surface of the volute cylinder portion 25 of the volute 9 through one or more first bearings 26, an inner circumferential surface of the support cylinder 22 is rotatably connected to an outer circumferential surface of the rotating shaft 10 through one or more second bearings 27, a first channel is formed between the outer circumferential surface of the support cylinder 22 and the volute cylinder portion 25, and a second channel is formed between the inner circumferential surface of the support cylinder 22 and the rotating shaft 10.

Further, radial holes 28 and an axial hole 29 are disposed on the rotating shaft 10. The plurality of radial holes 28 are distributed along the circumferential direction, the axial hole 29 penetrates through an end of the rotating shaft 10 located at an impeller cavity, and the radial holes 28 are in communication with the axial hole 29 and the impeller cavity.

According to the pump station for a fertilization and irrigation system and the water feeding pump or the fertilizer applying pump thereof in the present invention, by means of the design of the auxiliary rotating disc 11 and an associated structure thereof, the auxiliary rotating disc 11 is driven by the back blades 18 of the impeller to rotate, a high-pressure liquid on a back pressure side of the impeller passes through the communication grooves 24 and then a first part of the liquid passes through a gap between the auxiliary rotating disc 11 and the rear side wall of the volute to flow back to the pressurized water chamber of the volute, so that pressure loss can be reduced; a second part of the liquid passes through the first injection hole and the injection pipeline 32 to be guided to the second injection hole, and the second injection hole is used for injecting the high-pressure liquid to the inlet end of the impeller, so that the anti-cavitation performance of the centrifugal pump can be improved; a third part of the liquid passes through the gap between the auxiliary rotating disc 11 and the rear side wall of the volute to flow to the first channel, so as to cool the bearings, and can passes through the radial holes 28 and the axial hole 29 to flow back into the impeller cavity, so that the anti-cavitation performance of the centrifugal pump can be further improved; and another part of the high-pressure liquid on the back pressure side of the impeller passes through the second channel to flow to the radial holes 28 and the axial hole 29 and flow back into the impeller cavity, thereby completing cooling of the bearings and improving the anti-cavitation performance of the centrifugal pump.

According to the pump station for a fertilization and irrigation system and the water feeding pump or the fertilizer applying pump thereof in the present invention, by means of the design of the auxiliary rotating disc 11 and an associated structure thereof, pressure loss can be reduced, anti-cavitation performance of the centrifugal pump can be improved, and cooling of the bearings can be completed, so that stability of output pressure of the water feeding pump or the fertilizer applying pump can be improved, thereby ensuring that the water supply or fertilizer supply pressure/flow of the pump station of the sprinkling irrigation system is stable, and saving water and fertilizer for the integrated irrigation and fertilization system.

Further, a protruding step segment is disposed on the rotating shaft 10, a spiral groove 30 is disposed on the protruding step segment, the protruding step segment is disposed at a position corresponding to a right end of the support cylinder 22, the protruding step segment is disposed between the second bearings 27 and the radial holes 28, and the spiral groove 30 is used for improving fluidity of liquid in the second channel flowing to a side of the radial holes 28.

Figure 4:
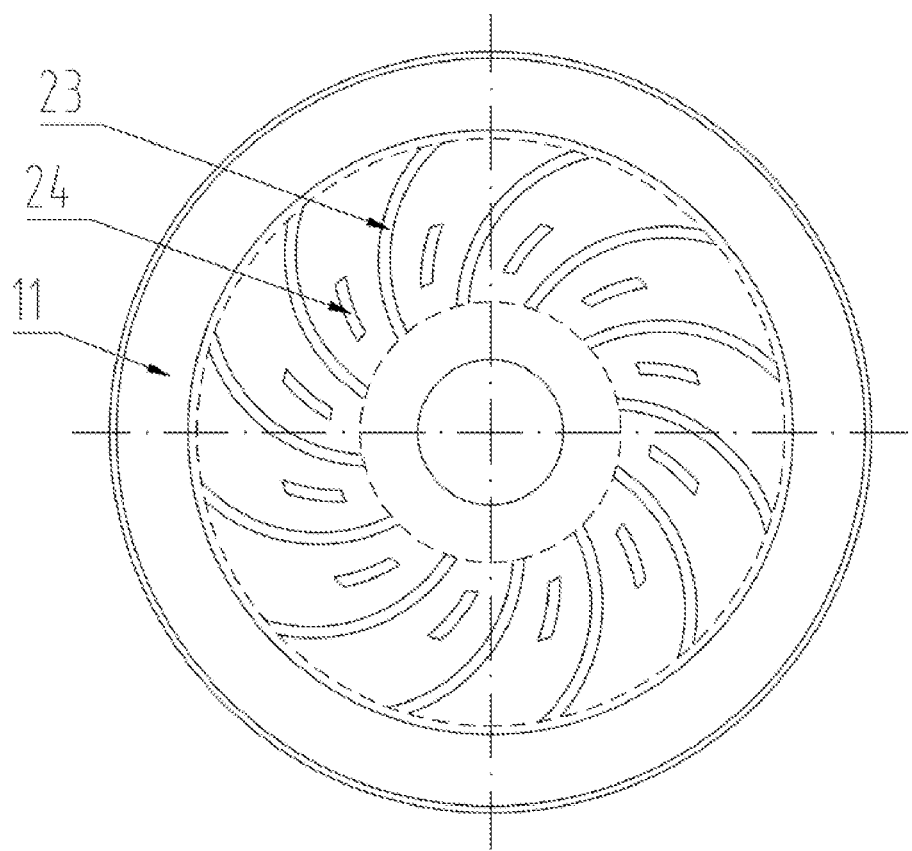
FIG. 4 is a schematic structural diagram of an auxiliary rotating disc according to the present invention.

As shown in FIG. 4, the plurality of communication grooves 24 and the plurality of auxiliary blades 23 are disposed alternately in the circumferential direction, a radial length range/position of the communication groove 24 is within a radial length range/position of the auxiliary blade 23, and a position of the communication groove 24 is disposed corresponding to a position of the first injection hole, the auxiliary blade 23 is an arc-shaped blade, the communication groove 24 is an arc-shaped groove, and the back blade 18 is an arc-shaped blade or a straight blade.

Further, an inlet end of the front disc 12 is provided with an inlet ring 15, the inlet ring 15 extends axially, guide blades 16 and a central flow guide body 17 are disposed in the inlet ring 15, the plurality of guide blades 16 are distributed along the circumferential direction and connected to an outer circumferential surface of the central flow guide body 17, the other ends of the guide blades 16 are connected to an inner circumferential surface of the inlet ring 15, the central flow guide body 17 is of a cylindrical structure, and has an arc-shaped flow guide surface at an upstream end and a downstream end thereof. By means of the design of the guide blades 16 and the central flow guide body 17, the present invention can further improve the anti-cavitation performance of the centrifugal pump.

According to the pump station for a fertilization and irrigation system and the water feeding pump or the fertilizer applying pump thereof in the present invention, by means of the design of the auxiliary rotating disc 11 and an associated structure thereof, pressure loss can be reduced, anti-cavitation performance of the centrifugal pump can be improved, and cooling of the bearings can be completed, so that stability of output pressure of the water feeding pump or the fertilizer applying pump can be improved, thereby ensuring that the water supply or fertilizer supply pressure/flow of the pump station of the sprinkling irrigation system is stable, and saving water and fertilizer for the integrated irrigation and fertilization system.

It should be noted that, in the embodiments of the present invention, all directional indications (such as up, down, left, right, front, back, horizontal, and vertical) are merely used to explain a relative position relationship, a motion situation, and the like between components in a specific gesture (as shown in the accompanying drawings). If the specific gesture changes, the directional indication changes accordingly. The "connection" may be a direct connection, or may be an indirect connection, and the "disposed", "disposed in", and "disposed on" may be disposed directly, or may be disposed indirectly.

The foregoing embodiments are a description of the present invention, and are not intended to limit the present invention. It should be understood that, various changes, modifications, replacements and variations can be made to these embodiments without departing from the principle and spirit of the present invention. The scope of protection of the present invention is defined by the appended claims and their equivalents.

What is claimed is:

1. A water feeding pump or a fertilizer applying pump for a pump station of a fertilization and irrigation system, wherein the water feeding pump (2) or the fertilizer applying pump (3) is a centrifugal pump, the centrifugal pump comprises a pump body portion (6), the pump body portion comprises a volute (9) and an impeller, the impeller is mounted in the volute and comprises a front disc (12), a rear disc (13), a plurality of main blades (14), and an inlet ring (15), the plurality of main blades are distributed along a circumferential direction and connected between the front disc and the rear disc, a plurality of back blades (18) distributed along the circumferential direction are disposed on a back surface of the rear disc, and the impeller is mounted on a rotating shaft (10), wherein an auxiliary rotating disc (11) is disposed between the impeller and a rear side wall of the volute, the auxiliary rotating disc is a rotating member and is driven by the back blades of the impeller to rotate;

the auxiliary rotating disc (11) comprises a first radial disc (19), an axial ring (20), and a second radial disc (21) which are sequentially connected, a support cylinder (22) is disposed at a center of the first radial disc, and a plurality of auxiliary blades (23) distributed along the circumferential direction are disposed on a side face, close to the back blades (18), of the first radial disc, the position of the auxiliary blades corresponds to the position of the back blades, a radial length of the auxiliary blades is equal to a radial length of the back blades, the support cylinder is rotatably connected to the rotating shaft (10) and/or a volute cylinder portion (25) of the volute, a plurality of communication grooves (24) distributed along the circumferential direction are disposed on the first radial disc, the communication grooves are in communication with a first chamber that is between the rear disc (13) of the impeller and the auxiliary rotating disc and a second chamber that is between the auxiliary rotating disc and the rear side wall of the volute, and the second radial disc is disposed in a diffuser that is between an outer circumferential surface of the impeller and a pressurized water chamber of the volute; a first injection hole is disposed on the rear side wall of the volute, the first injection hole is in communication with a second injection hole on an inlet pipe (31) of the volute through an injection pipeline (32), the second injection hole is used for injecting a high-pressure liquid to an inlet end of the impeller, and a control valve is disposed on the injection pipeline; an outer circumferential surface of the support cylinder (22) is rotatably connected to an inner circumferential surface of the volute cylinder portion (25) of the volute (9) through one or more first bearings (26), an inner circumferential surface of the support cylinder is rotatably connected to an outer circumferential surface of the rotating shaft (10) through one or more second bearings (27), a first channel is formed between the outer circumferential surface of the support cylinder and the volute cylinder portion, and a second channel is formed between the inner circumferential surface of the support cylinder and the rotating shaft; and a plurality of radial holes (28) and an axial hole (29) are disposed on the rotating shaft (10), wherein the plurality of radial holes are distributed along the circumferential direction, the axial hole penetrates through an end of the rotating shaft located at an impeller cavity, and the radial holes are in communication with the axial hole and the impeller cavity; and a protruding step segment is disposed on the rotating shaft (10), a spiral groove (30) is disposed on the protruding step segment, the protruding step segment is disposed at a position corresponding to a right end of the support cylinder (22), the protruding step segment is disposed between the one or more second bearings (27) and the radial holes (28), and the spiral groove is used for improving fluidity of liquid in the second channel flowing to a side of the radial holes.

2. The water feeding pump or the fertilizer applying pump for a pump station of a fertilization and irrigation system according to claim 1, wherein the plurality of communication grooves (24) and the plurality of auxiliary blades (23) are disposed alternately in the circumferential direction, a radial length range of each communication groove is within a radial length range of the auxiliary blades, and the positions of the communication grooves is correspond to a position of the first injection hole, the auxiliary blades are arc-shaped, the communication grooves are arc-shaped, and the back blades arc-shaped blades or a straight blades.

3. The water feeding pump or the fertilizer applying pump for a pump station of a fertilization and irrigation system according to claim 2, wherein an inlet end of the front disc (12) is provided with the inlet ring (15), the inlet ring extends axially, guide blades (16) and a central flow guide body (17) are disposed in the inlet ring, the plurality of guide blades are distributed along the circumferential direction and connected to an outer circumferential surface of the central flow guide body, the other ends of the guide blades are connected to an inner circumferential surface of the inlet ring, and the central flow guide body is of a cylindrical structure, and has an arc-shaped flow guide surface at an upstream end and a downstream end thereof.

4. A pump station for a fertilization and irrigation system, comprising a base (1), a water feeding pump (2), a fertilizer applying pump (3), a control system (4), a fertilization and irrigation main duct (5), a pump body portion (6), a motor (7), and a water outlet duct (8), wherein the water feeding pump or the fertilizer applying pump or both are the centrifugal pump according to claim 1; wherein the water feeding pump, the fertilizer applying pump, and the control system are mounted on the base, the water feeding pump or the fertilizer applying pump comprises the pump body portion and the motor, the pump body portion is connected to the motor through a transmission assembly, an outlet end of the pump body portion is connected to the water outlet duct, the water outlet duct is connected to the fertilization and irrigation main duct, and the fertilizer applying pump is connected to the fertilization and irrigation main duct.

5. The pump station for a fertilization and irrigation system according to claim 4, wherein the water feeding pump (2) comprises one or more centrifugal pumps according to claim 1, the water feeding pump is used for supplying water, the fertilizer applying pump (3) comprises one or more centrifugal pumps according to claim 1, and the fertilizer applying pump is used for supplying fertilizer solution; a control valve, a pressure gauge and/or a flow meter are connected to the water outlet duct (8) and/or the fertilization and irrigation main duct (5).

* * * * *